(12) United States Patent
Zhu et al.

(10) Patent No.: US 11,650,402 B2
(45) Date of Patent: May 16, 2023

(54) FREEFORM SURFACE OFF-AXIAL THREE-MIRROR IMAGING SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Rui-rui Tang, Beijing (CN); Wei-Chen Wu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 246 days.

(21) Appl. No.: 16/999,222

(22) Filed: Aug. 21, 2020

(65) Prior Publication Data
US 2021/0215918 A1 Jul. 15, 2021

(30) Foreign Application Priority Data
Jan. 15, 2020 (CN) .......................... 202010040635.X

(51) Int. Cl.
*G02B 17/06* (2006.01)
*G02B 5/10* (2006.01)
*G02B 27/00* (2006.01)

(52) U.S. Cl.
CPC ........... *G02B 17/0642* (2013.01); *G02B 5/10* (2013.01); *G02B 27/0012* (2013.01)

(58) Field of Classification Search
CPC .................................................. G02B 17/0642
See application file for complete search history.

(56) References Cited

U.S. PATENT DOCUMENTS

| 5,477,395 | A  | * | 12/1995 | Cook | ...................... | G02B 23/06 |
| | | | | | | 359/861 |
| 8,123,371 | B2 | * | 2/2012 | Cook | .................. | G02B 17/0663 |
| | | | | | | 359/728 |
| 8,427,744 | B2 | * | 4/2013 | Cook | ...................... | G02B 23/06 |
| | | | | | | 359/399 |
| 11,320,637 | B2 | * | 5/2022 | Choi | .................. | G02B 17/0657 |
| 2011/0085235 | A1 | | 4/2011 | Cook | | |

(Continued)

FOREIGN PATENT DOCUMENTS

| CN | 105334607 | | 2/2016 |
| CN | 106371200 | | 2/2017 |
| CN | 110989152 | A * | 4/2020 |

(Continued)

*Primary Examiner* — Christopher Stanford
(74) *Attorney, Agent, or Firm* — ScienBiziP, P.C.

(57) ABSTRACT

A freeform surface off-axial three-mirror imaging system is provided. The freeform surface off-axial three-mirror imaging system comprises a primary mirror, a secondary mirror, and a compensating mirror. The primary mirror, the secondary mirror, and the compensating mirror are located adjacent and spaced away from each other. A surface shape of each of the primary mirror and the secondary mirror is a quadric surface. The primary mirror is used as an aperture stop. A surface shape of the compensating mirror is a freeform surface. A light emitted from a light source is reflected by the primary mirror, the secondary mirror, and the compensating mirror to form an image on an image plane.

16 Claims, 7 Drawing Sheets

(56) References Cited

U.S. PATENT DOCUMENTS

2014/0254003 A1* 9/2014 Katashiba .......... G02B 17/0647
                                                                          359/366
2021/0191102 A1* 6/2021 Choi .................. G02B 17/0652

FOREIGN PATENT DOCUMENTS

WO        WO-9534840 A1 * 12/1995 ......... G02B 17/0626
WO        WO-0177734 A1 * 10/2001 ......... G02B 17/0652

* cited by examiner

RMS = 0.022204  RMS = 0.014328
(0.50,0.10) DEG  (0.50,0.00) DEG

RMS = 0.018211  RMS = 0.021217
(0.50,-0.10) DEG  (0.00,0.10) DEG

RMS = 0.023191  RMS = 0.024495
(0.00,0.00) DEG  (0.00,-0.10) DEG 0.520e-01 mm

FREEFORM SURFACE OFF-AXIAL THREE-MIRROR IMAGING SYSTEM

CROSS-REFERENCE TO RELATED APPLICATIONS

This application claims all benefits accruing under 35 U.S.C. § 119 from China Patent Application No. 202010040635.X filed on Jan. 15, 2020, in the China National Intellectual Property Administration, the contents of which are hereby incorporated by reference.

FIELD

The present disclosure relates to a freeform surface off-axial three-mirror imaging system.

BACKGROUND

An optical performance of an optical system is related to numerous factors. It is commonly found that it is difficult to improve one optical parameter without changing the other properties of the system. When compared with refractive systems, reflective systems offer the advantages of high transmission, an absence of chromatic aberrations, and larger aperture sizes. Therefore, reflective systems are widely used in a space detection field. A Ritchey-Chretien (R-C) telescope system is a coaxial reflective design containing two hyperboloidal mirrors that can correct spherical aberrations and coma defects very well within narrow fields. While a field-of-view of the R-C telescope is narrow, it still serves as a prototype for most astronomical telescopes because of its simple structure and remarkable image quality. Improvements in the field-of-view of the R-C telescope have been commonly pursued by designers for many years. For example, some designers added a refractive lens to improve the field-of-view; however, this could lead to a narrow working spectrum and low optical transmission.

BRIEF DESCRIPTION OF THE DRAWINGS

Implementations of the present technology will now be described, by way of embodiment, with reference to the attached figures.

DETAILED DESCRIPTION

Figure 1:
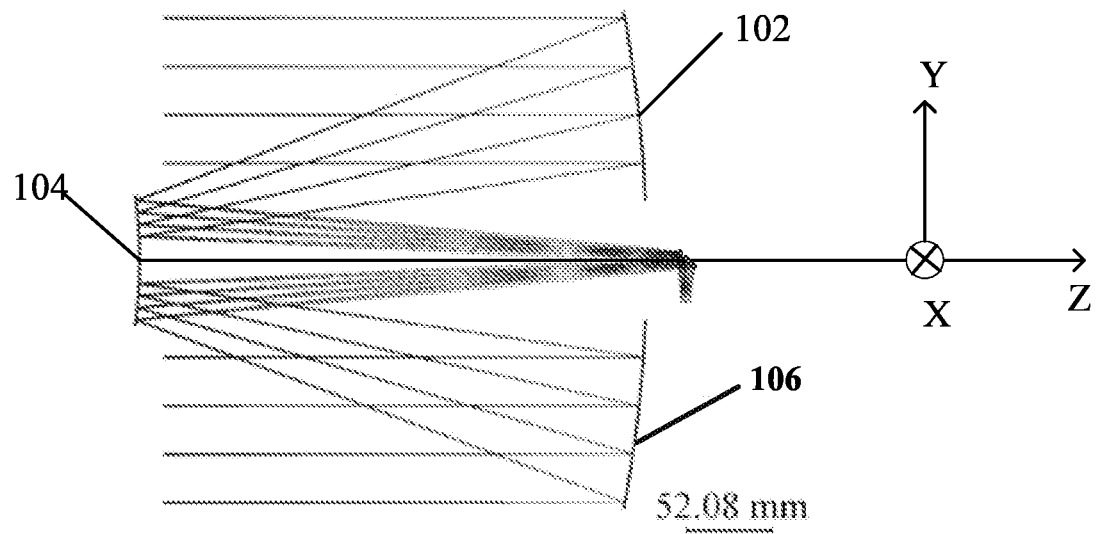
FIG. 1 is a view of one embodiment of a freeform surface off-axial three-mirror imaging system.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Referring to FIG. 1, a freeform surface off-axial three-mirror imaging system 100 according to one embodiment is provided. The freeform surface off-axial three-mirror imaging system 100 comprises a primary mirror 102, a secondary mirror 104, and a compensating mirror 106. The primary mirror 102, the secondary mirror 104, and the compensating mirror 106 are located adjacent and spaced away from each other. A surface shape of each of the primary mirror 102 and the secondary mirror 104 is a quadric surface. The primary mirror 102 is used as an aperture stop. A surface shape of the compensating mirror 106 is a freeform surface. A light emitted from a light source would be reflected by the primary mirror 102, the secondary mirror 104, and the compensating mirror 106 to form an image on an image plane.

A first three-dimensional rectangular coordinates system (X,Y,Z) is defined by a location of the secondary mirror 104. A vertex of the secondary mirror 104 is an origin of the three-dimensional rectangular coordinates system (X,Y,Z). A horizontal line passing through the vertex of the secondary mirror 104 is defined as a Z-axis; in the Z-axis, to the left is negative, and to the right is positive. A Y-axis is substantially perpendicular to the Z-axis and in a plane shown in FIG. 1; in the Y-axis, to the upward is positive, and to the downward is negative. An X-axis is substantially perpendicular to a YZ plane; in the X-axis, to the inside is positive, and to the outside is negative.

In the three-dimensional rectangular coordinate system (X,Y,Z), the reflection surface of the compensating mirror 106 is a freeform surface. The freeform surface can be a freeform surface based on a plane or a freeform surface with a large curvature radius. In one embodiment, a reflective surface of the compensating mirror 106 in the first three-dimensional rectangular coordinates system (X,Y,Z) is an xy polynomial freeform surface; and an xy polynomial equation can be expressed as follows:

$$z(x,y) = \frac{c(x^2+y^2)}{1+\sqrt{1-(1+k)c^2(x^2+y^2)}} + \sum_{i=1}^{N} A_i x^m y^n$$

In the xy polynomial equation, z represents surface sag, c represents surface curvature, k represents conic constant, while Ai represents the ith term coefficient. Since the freeform surface off-axial three-mirror imaging system 100 is symmetrical about a YOZ plane, so only even order terms of x can remain. In one embodiment, the reflective surface of compensating mirror 106 is a fourth-order polynomial freeform surface of xy without odd items of x; and an equation of the fourth-order polynomial freeform surface of xy can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4.$$

In one embodiment, the values of c, k, and Ai in the equation of the fourth-order polynomial freeform surface of xy of the reflective surface of the compensating mirror 106 are listed in TABLE 1. However, the values of c, k, and Ai in the fourth order xy polynomial equation are not limited to TABLE 1.

TABLE 1

| c | 0 |
|---|---|
| Conic Constant (k) | 0 |
| $A_2$ | 0.01810477796091 |
| $A_3$ | −0.000129612104901501 |
| $A_5$ | 3.84698291327196e−006 |
| $A_7$ | 1.51205186864189e−007 |
| $A_9$ | 1.112143202781e−006 |
| $A_{10}$ | 5.64192252755114e−007 |
| $A_{12}$ | 6.21311873839925e−007 |
| $A_{14}$ | −1.24635789956992e−007 |

A reflecting surface of the primary mirror 102 is a quadric surface, and an equation of the quadric surface can be expressed as follows:

$$z(x, y) = \frac{c(x^2 + y^2)}{1 + \sqrt{1 - (1+k)c^2(x^2 + y^2)}}$$

In the equation, z represents surface sag, c represents surface curvature, k represents conic constant. In one embodiment, the values of c and k of the quadric surface of the primary mirror 102 are listed in Table 2. However, the values of c and k in the equation of the quadric surface of the primary mirror 102 are not limited to TABLE 2.

TABLE 2

| c | −0.0012011734430515 |
|---|---|
| Conic Constant (k) | −1.049581159181 |

A reflecting surface of the secondary mirror 104 is a quadric surface, and an equation of the quadric surface can be expressed as follows:

$$z(x, y) = \frac{c(x^2 + y^2)}{1 + \sqrt{1 - (1+k)c^2(x^2 + y^2)}}$$

In the equation, z represents surface sag, c represents surface curvature, k represents conic constant. In one embodiment, the values of c and k of the quadric surface of secondary mirror 104 are listed in Table 3. However, the values of c and k in the equation of the quadric surface of secondary mirror 104 are not limited to TABLE 3.

TABLE 3

| c | −0.003565906194572 |
|---|---|
| Conic Constant (k) | −3.668227226235 |

The materials of the primary mirror 102, the secondary mirror 104, and the compensating mirror 106 can be aluminum, beryllium, or other metals. The materials of the primary mirror 102, the secondary mirror 104, and the compensating mirror 106 can also be silicon carbide, quartz, or other inorganic materials. A reflection enhancing coating can also be coated on the metals or inorganic materials to enhance the reflectivity performance of the three mirrors. In one embodiment, the reflection enhancing coating is a gold film. A size of each of the primary mirror 102, the secondary mirror 104 and the t compensating mirror 106 can be designed according to actual needs.

In one embodiment, in the three-dimensional rectangular coordinate system (X, Y, Z), a distance between a center of the primary mirror 102 and a center of the secondary mirror 104 in the Z-axis direction is about 314.8834031968 mm, and a distance between a center of the compensating mirror 106 and a center of the secondary mirror 104 in the Z-axis direction is about 339.8834031968 mm. An angle between the compensating mirror 106 and the Y-axis is about 45°.

Figure 2A:
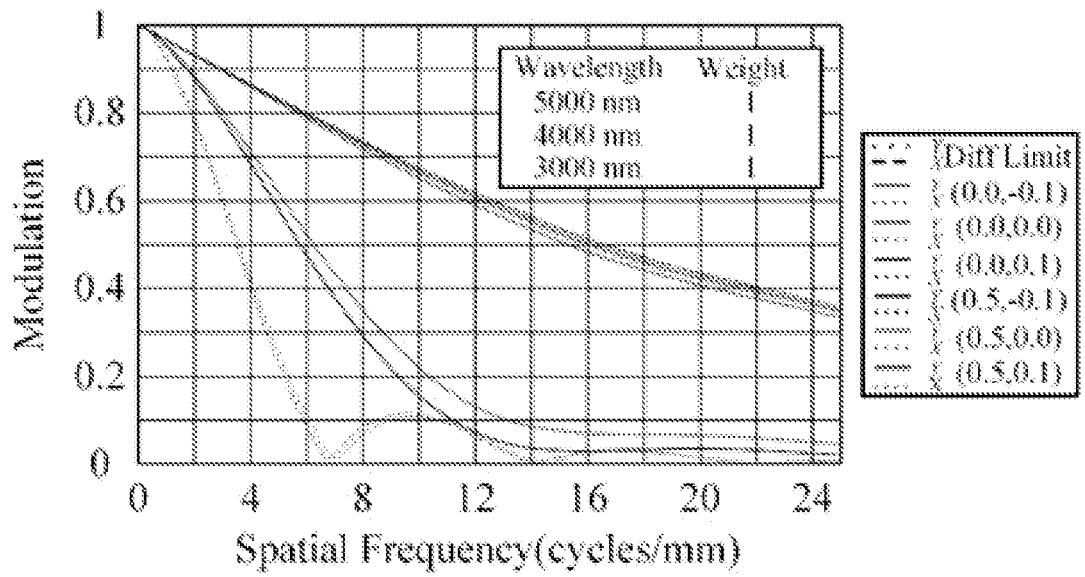
FIG. 2A is a modulation transfer functions (MTF) diagram of the traditional R-C telescope without adding a compensating mirror.
Figure 2B:
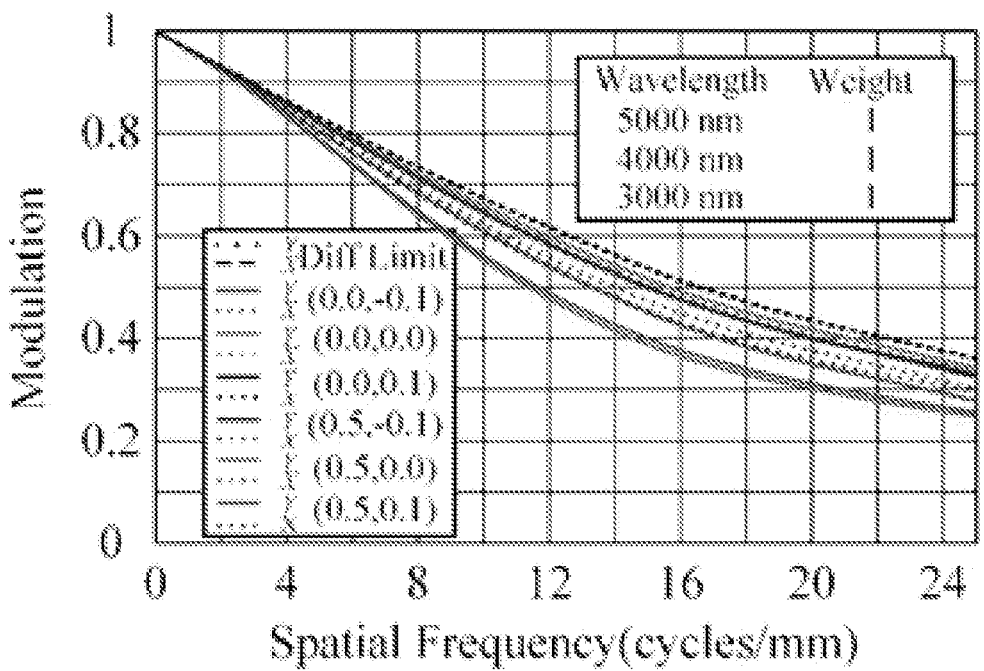
FIG. 2B is the modulation transfer functions (MTF) diagram of the freeform surface off-axial three-mirror imaging system.

FIG. 2A is the modulation transfer function (MTF) graph of the RC telescope without the compensating mirror in the mid-wave infrared band (3-5 μm), and FIG. 2B is the modulation transfer function (MTF) the freeform surface off-axial three-mirror imaging system 100 the infrared wave band (3-5 μm). As shown in FIG. 2A, before the compensating mirror 106 is added, the system cannot acquire an image of the field (0.5, 0.1). In contrast, the freeform surface off-axis three-mirror imaging system 100 with the compensating mirror 106 added has an MTF value of more than 0.3 at all fields of view at 20 lp/mm.

Figure 3:
FIG. 3 is a spot diagram of one embodiment of the freeform surface off-axis three-mirror imaging system.
Figure 3:
Figure 3:
Figure 4:
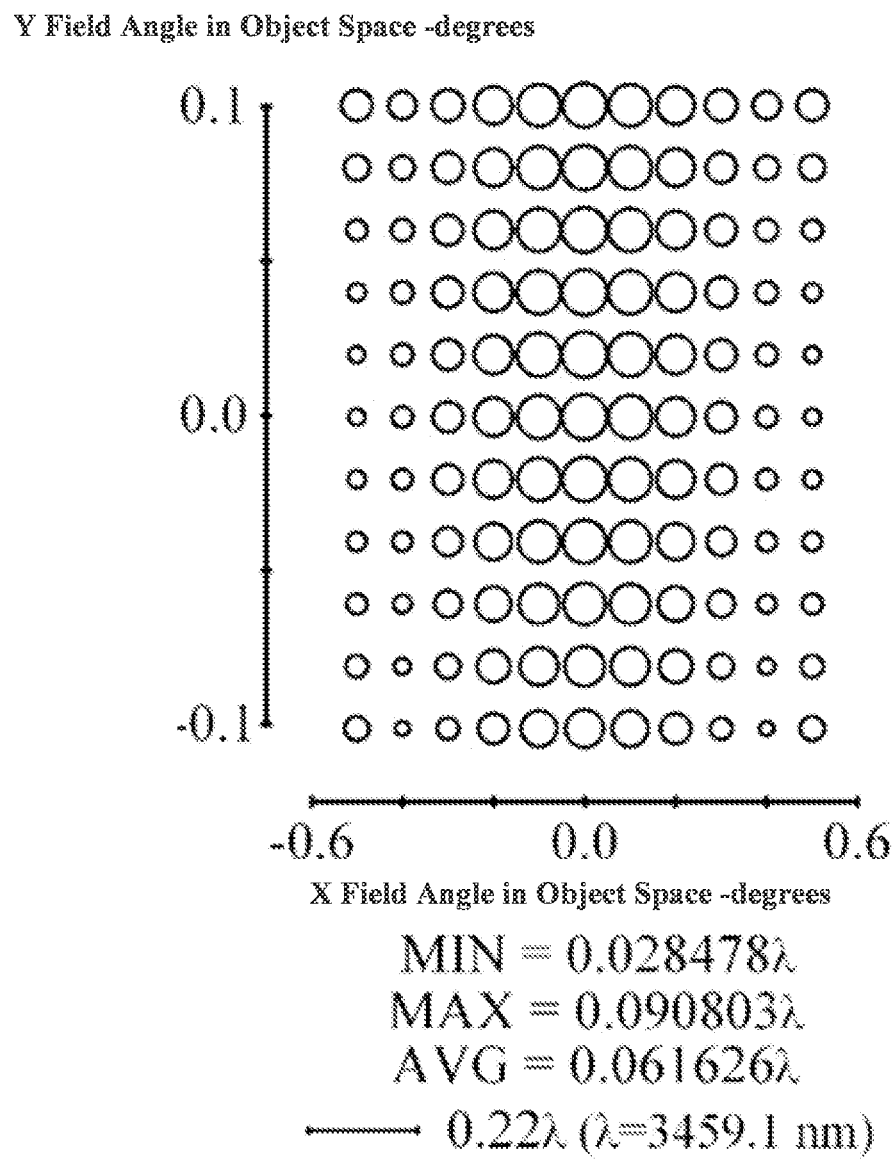
FIG. 4 is a field map of the RMS wavefront error of one embodiment of the freeform surface off-axis three-mirror imaging system.

FIG. 3 is a spot diagram of the freeform surface off-axis three-mirror imaging system 100. As shown in FIG. 3, the RMS error value of ta light spot in all fields is less than 0.025 mm. FIG. 4 is a field map of the RMS wavefront error of the freeform surface off-axis three-mirror imaging system 100. An average RMS wavefront error of freeform surface off-axis three-mirror imaging system 100 is 0.061λ at a wavelength (λ) of 3459.1 nm, which is close to the diffraction limit. The above results indicate that, after the compensating mirror 106 is added, the freeform surface off-axis three-mirror imaging system 100 can not only obtain images of a same quality, but also double the field of view.

An as-built optical system usually has lower image quality than a designed result because many errors occur during a development process. An assembly tolerance of the compensating mirror 106 will be analyzed below. Specifically, the tolerance analysis can be evaluated according to the image quality of the freeform surface off-axis three-mirror imaging system 100. The MTF value at 20 lp/mm is used as an evaluation quantity for the tolerance analysis. Generally, when the MTF value of an optical system exceeds 0.2, the system is considered to have good image quality. As shown in FIG. 2, the MTF values of the freeform surface off-axis three-mirror imaging system 100 all exceed 0.3, so a maximum tolerance of the freeform surface off-axis three-mirror imaging system 100 is 0.1. Table 4 shows the results from analyzing the tolerance of the compensating mirror 106 using the tolerance analysis functions of CODE V software. Six assembly tolerance terms of the compensating mirror 106 are analyzed, comprising an x-decenter, a y-decenter, a z-decenter, an α-tilt, a β-tilt and a γ-tilt. Table 5 shows MTFs for each field after the addition of the above tolerances. The results show that the MTF of all fields of view in the system exceeds 0.2, which satisfies the evaluation conditions. In a word, the compensating mirror 106 has lower sensitivity during the assembly process.

TABLE 4

| Tolerance | Value |
| --- | --- |
| Decenters | ±0.2 mm |
| Tilts | ±0.001 rad |

TABLE 5

| Relative fields | MTF of design | MTF with tolerance | Change of MTF |
| --- | --- | --- | --- |
| 0.00, −1.00 | 0.3095 | 0.3032 | −0.0063 |
| 0.00, 0.00 | 0.2993 | 0.2944 | −0.0049 |
| 0.00, 1.00 | 0.3972 | 0.3914 | −0.0058 |
| 1.00, −1.00 | 0.4012 | 0.3934 | −0.0078 |
| 1.00, 0.00 | 0.4168 | 0.4156 | −0.0012 |
| 1.00, 1.00 | 0.3488 | 0.3329 | −0.0159 |

Table 6 shows the parameters of the R-C telescope system without the compensating mirror 106. Table 7 shows parameters of the freeform surface off-axis three-mirror imaging system 100. As can be seen from the comparison of Table 6 and Table 7, the use of freeform compensating mirror in the freeform surface off-axis three-mirror imaging system 100 can improve the field of view of the RC telescope, without changing the parameters of the RC system primary mirror and secondary mirror. The field of view has doubled.

TABLE 6

| Parameter | value |
| --- | --- |
| Effective focal length | 1500 mm |
| Field of view | 0.5° × 0.2° |
| F-number | 5 |
| Entrance pupil diameter | 300 mm |
| Wavelength | 3-5 μm |

TABLE 7

| Parameter | value |
| --- | --- |
| Effective focal length | 1500 mm |
| Field of view | 1.0° × 0.2° |
| F-number | 5 |
| Entrance pupil diameter | 300 mm |
| Wavelength | 3-5 μm |

A point-by-point construction-iteration (CI-3D) design method is used to design the compensating mirror 106. A method of designing the compensating mirror 106 comprises the following steps:

S1, establishing an initial system and selecting a plurality of feature fields;

S2, selecting a feature field from the plurality of feature fields as a construction feature field, gradually expanding the construction feature field and constructing the initial system into a freeform surface system comprising a freeform surface; and S3, iterating the freeform surface system continuously and optimizing the results.

Figure 5:
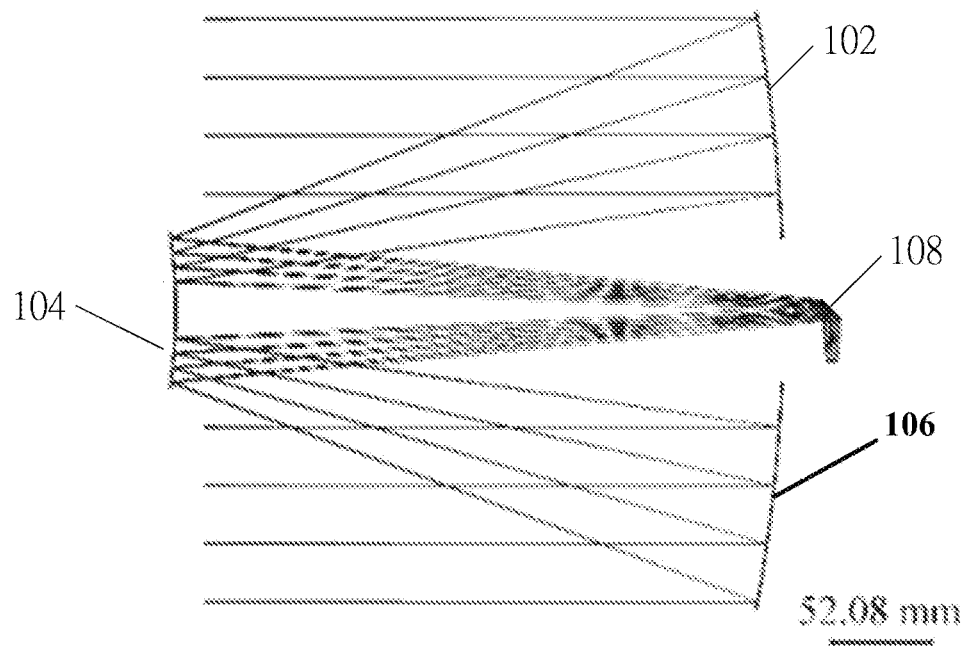
FIG. 5 is a schematic diagram of one embodiment of a construction process of the compensating mirror.
Figure 6:
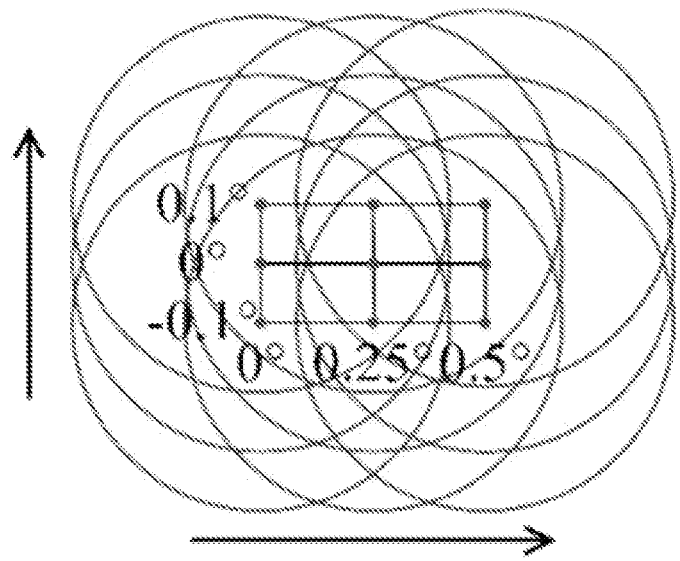
FIG. 6 is a schematic diagram of one embodiment of feature fields of view of the compensation mirror.
Figure 7:
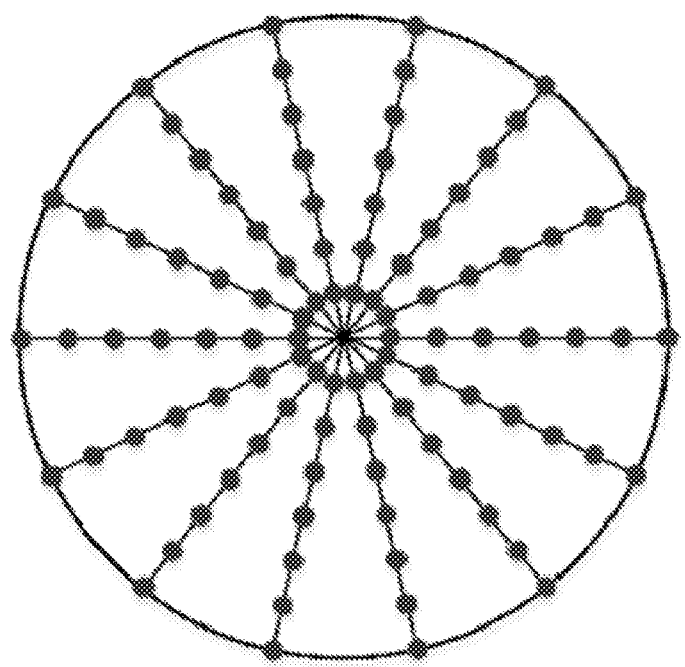
FIG. 7 is a schematic diagram of one embodiment of feature rays of the compensation mirror.

In step S1, as shown in FIG. 5, a plane mirror 108 is provided between the primary mirror 102 and the image plane. After being reflected by the plane mirror 108, an incident light will rotate 90°. Then, many characteristic rays from multiple fields with different pupil coordinates are sampled. Specifically, M feature fields are isometrically sampled in the sagittal direction and meridian direction, and K feature rays are selected in each of the M feature fields. A method of selecting the K feature rays comprises steps of: an aperture of each of the M fields is divided into N equal parts; and P feature rays at different aperture positions in each of the N equal parts are selected. As such, K=M×N×P different feature rays correspond to different aperture positions and different fields are selected. The aperture can be a circle, rectangle, square, oval, or another shape. In one embodiment, the aperture of each of the M fields is a circle, and a circular aperture of each of the M fields is divided into N angles with equal interval φ, as such, N=2π/φ; then, P different aperture positions are fixed along a radial direction of each of the N angles. Therefore, K=M×N×P different feature rays correspond to different aperture positions, and different fields are selected. In one embodiment, as shown in FIG. 6, 9 feature fields are sampled in the entire field. As shown in FIG. 7, the aperture of each field is divided into 14 equal parts; and 7 feature rays at different aperture positions in each of the 14 equal parts are selected. As such, 98 different feature rays are selected in each field. Therefore, a total of 9×98=882 feature rays are sampled in this embodiment, which is used for the subsequent construction of freeform surfaces.

In step S2, the freeform surface off-axial three-mirror imaging system is usually symmetric in the sagittal direction, thus, when constructing the initial system into the freeform surface system, only the feature rays of a half field in the sagittal direction can be considered. Referring to FIG. 2, in one embodiment, the central field $(0, \varphi y0)$ is as a first construction feature field $\varphi 1$, during expanding the construction feature field, the construction feature field in the meridional direction is expanded in both positive and negative directions, the construction feature field in the sagittal direction is expanded in a positive direction.

The initial system comprises L initial surfaces, and the L initial surfaces are defined as $L_j$ (j=1, 2, . . . L). The step S2 comprises the steps of:

S21, selecting at least one field of the M feature fields $\varphi_i$ (i=1, 2, . . . M) as the first construction feature field, and constructing an initial surface $L_1$ into a freeform surface $N_1$ in the first construction feature field;

S22, adding at least one feature field to expand the first construction feature field to obtain a second construction feature field, and constructing an initial surface $L_2$ into a freeform surface $N_2$ in the second construction feature field; and S23, in the same way as step S22, expanding the construction feature field by adding at least one feature field each time to obtained an expanded construction feature field, and constructing an initial surface $L_j$ (j=3, . . . L) into a freeform surface $N_j$ (j=3, . . . L) in the expanded construction feature field, until the L initial surfaces are constructed into L freeform surfaces.

In step S21, a method of constructing the initial surface $L_j$ into the freeform surface $N_j$ in the first construction feature field comprises: calculating a plurality of feature data points $P_i$ (i=1, 2 ... K) on the freeform surface $N_l$; and surface fitting the plurality of feature data points to obtain an equation of the freeform surface $N_l$.

A surface Ω is defined as the freeform surface $N_l$, a surface Ω' is defined as a surface located adjacent to and before the surface Ω, and a surface Ω" is defined as a surface located adjacent to and after the surface Ω. The intersections of the plurality of feature rays $R_i$ (i=1, 2 ... K) with the surface f are defined as the first feature data points $P_i$ (i=1, 2 ... K). The plurality of feature rays $R_i$ (i=1, 2 ... K) are intersected with the surface Ω' at a plurality of start points $S_i$ (i=1, 2 ... K), and intersected with the surface Ω" at a plurality of end points $E_i$ (i=1, 2 ... K). When the surface Q and the plurality of feature rays $R_i$ (i=1, 2 ... K) are determined, the plurality of start points $S_i$ (i=1, 2 ... K) of the feature rays $R_i$ (i=1, 2 ... K) can also be determined. The plurality of end points $E_i$ (i=1, 2 ... K) can also be obtained based on the object-image relationship or given mapping relationship. Under ideal conditions, the feature rays $R_i$ (i=1, 2 ... K) emitted from the plurality of start points $S_i$ (i=1, 2 ... K) on the surface Ω'; pass through the first feature data points $P_i$ (i=1, 2 ... K) on the surface Ω; intersect with the surface Ω" at the plurality of end points $E_i$ (i=1, 2 ... K); and finally intersect with the image plane at the plurality of ideal target points $T_{i,ideal}$ (i=1, 2 ... K). If the surface Ω" is the target plane, the plurality of end points $E_i$ (i=1, 2 ... K) are the plurality of ideal target points $I_i$ (i=1, 2 ... K). If there are other surfaces between the surface Ω and the target plane, the plurality of end points $E_i$ (i=1, 2 ... K) are the points on the surface Ω", which make the first variation of the optical path length between the first feature data points $P_i$ (i=1, 2 ... K) and their corresponding target points zero.

$$\delta S = \delta \int_{P_i}^{T_i} n\,ds = 0,$$

wherein ds is the differential elements of the optical path length along the plurality of feature rays $R_i$ (i=1, 2 ... K), n denotes the refractive index of the medium, and δ denotes a differential variation.

A method of calculating the plurality of feature data points $P_i$ (i=1, 2 ... K) comprises:

step (a): defining a first intersection of a first feature light ray $R_1$ and the initial surface as a feature data point P;

step (b): when an ith (1≤i≤K−1) feature data point $P_i$ (1≤i≤K−1) has been obtained, a unit normal vector $\vec{N}_i$ at the ith (1≤i≤K−1) feature data point $P_i$ (1≤i≤K−1) can be calculated based on the vector form of Snell's law;

step (c): making a first tangent plane through the ith (1≤i≤K−1) feature data point $P_i$ (1≤i≤K−1), and (K−i) second intersections can be obtained by the first tangent plane intersecting with remaining (K−i) feature rays; a second intersection $Q_{i+1}$, which is nearest to the ith (1≤i≤K−1) feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith feature data point $P_i$ (1≤i≤K−1) is defined as $d_i$;

step (d): making a second tangent plane at (i−1) feature data points that are obtained before the ith feature data point $P_i$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the (i−1) third intersections and its corresponding feature data point form an intersection pair; the intersection pair, which has the shortest distance between a third intersection and its corresponding feature data point, is fixed; and the third intersection and the shortest distance is defined as $Q'_{i+1}$ and $d'_i$ respectively;

step (e): comparing $d_i$ and $d'_i$, if $d_i \leq d'_i$, $Q_{i+1}$ is taken as the next feature data point $P_{i+1}$ (1≤i≤K−1); otherwise, $Q'_{i+1}$ is taken as the next feature data point $P_{i+1}$ (1≤i≤K−1); and step (f): repeating steps from (b) to (e), until the plurality of feature data points $P_i$ (i=1, 2 ... K) are all calculated.

In step (b), the unit normal vector $\vec{N}_i$ (1≤i≤K−1) at each of the feature data point $P_i$ (1≤i≤K−1) can be calculated based on the vector form of Snell's Law. When the freeform surface $N_1$ is a refractive surface, $$\vec{N}_i = \frac{n'\vec{r}'_i - n\vec{r}_i}{|n'\vec{r}'_i - n\vec{r}_i|} \quad (1)$$

$$\vec{r}_i = \frac{\overrightarrow{P_i S_i}}{|\overrightarrow{P_i S_i}|}$$

is a unit vector along a direction of an incident ray for the freeform surface $N_1$;

$$\vec{r}'_i = \frac{\overrightarrow{E_i P_i}}{|\overrightarrow{E_i F_i}|}$$

is a unit vector along a direction for an exit ray of the first freeform surface; and n, n' is refractive index of a media before and after the freeform surface $N_1$ respectively.

Similarly, when the freeform surface $N_1$ is a reflective surface, $$\vec{N}_i = \frac{\vec{r}'_i - \vec{r}_i}{|\vec{r}'_i - \vec{r}_i|} \quad (2)$$

The unit normal vector $\vec{N}_i$ at each of the plurality of feature data points $P_i$ (i=1, 2 ... K) is perpendicular to the first tangent plane at each of the plurality of feature data points $P_i$ (i=1, 2 ... K). Thus, the first tangent plane at each of the plurality of feature data points $P_i$ (i=1, 2 ... K) can be obtained.

In one embodiment, the space of the initial system is defined as a first three-dimensional rectangular coordinates system. The propagation direction of beams is defined as a Z-axis, and the Z-axis is perpendicular to an XOY plane.

The compensation mirror in the freeform surface off-axis three-mirror imaging system 100 is an optical freeform surface, which has more control variables than a spherical or aspherical system, and is more conducive to correcting aberrations to obtain a better image quality. The use of freeform compensation mirrors in the freeform surface off-axis three-mirror imaging system 100 can improve the field of view of the freeform surface off-axis three-mirror imaging system 100, and the field of view expands to twice the original without changing the parameters of the system's primary and secondary mirrors. In addition, the compensation mirror is based on a planar optical freeform surface, which has a low assembly sensitivity.

The application field of the freeform surface off-axis three-mirror imaging system 100 provided by the present invention is not limited to the field of astronomical observations such as R-C telescopes, and can also comprise the fields of earth observation, space target detection, multi-spectral thermal imaging, stereo mapping, and the like.

Even though numerous characteristics and advantages of certain inventive embodiments have been set out in the foregoing description, together with details of the structures and functions of the embodiments, the disclosure is illustrative only. Changes may be made in detail, especially in matters of an arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A freeform surface off-axial three-mirror imaging system, comprising:
a primary mirror, a secondary mirror, and a compensating mirror, wherein the primary mirror, the secondary mirror and the compensating mirror are located adjacent and spaced away from each other, a surface shape of each of the primary mirror and the secondary mirror is a quadric surface, the primary mirror is an aperture stop, a surface shape of the compensating mirror is a freeform surface, a light emitted from a light source is reflected by the primary mirror, the secondary mirror, the compensating mirror to form an image on an image plane, and an F-number of view of the freeform surface off-axial three-mirror imaging system is 5;
a first three-dimensional rectangular coordinates system (X, Y, Z) is defined by a location of the secondary mirror, a vertex of the secondary mirror is an origin of the three-dimensional rectangular coordinates system (X, Y, Z), a reflective surface of the compensating mirror is an xy polynomial freeform surface; and an xy polynomial equation is $$z(x, y) = \frac{c(x^2 + y^2)}{1 + \sqrt{1 - (1+k)c^2(x^2 + y^2)}} + \sum_{i=1}^{N} A_i x^m y^n,$$

wherein z represents surface sag, c represents surface curvature, k represents conic constant, while Ai represents an ith term coefficient; and
the reflective surface of compensating mirror is a fourth-order polynomial freeform surface of xy without odd items of x; and an equation of the fourth-order polynomial freeform surface of xy is:

$$z(x, y) = \frac{c(x^2 + y^2)}{1 + \sqrt{1 - (1+k)c^2(x^2 + y^2)}} + A_2 y +$$
$$A_3 x^2 + A_5 y^2 + A_7 x^2 y + A_9 y^3 + A_{10} x^4 + A_{12} x^2 y^2 + A_{14} y^4$$

wherein c=0, k=0, $A_2$=0.01810477796091, $A_3$=−0.000129612104901501, $A_5$=3.84698291327196e-006, $A_7$=1.51205186864189e-007, $A_9$=1.112143202781e-006, $A_{10}$=5.64192252755114e-007, $A_{12}$=6.21311873839925e-00, and $A_{14}$=−1.24635789956992e-007.

2. The freeform surface off-axial three-mirror imaging system of claim 1, wherein a reflecting surface of the primary mirror is a quadric surface, and an equation of the quadric surface is:

$$z(x, y) = \frac{c(x^2 + y^2)}{1 + \sqrt{1 - (1+k)c^2(x^2 + y^2)}}$$

wherein z represents surface sag, c represents surface curvature, c=−0.0012011734430515, k represents conic constant, and k=−1.049581159181.

3. The freeform surface off-axial three-mirror imaging system of claim 1, wherein a reflecting surface of the secondary mirror is a quadric surface, and an equation of the quadric surface is:

$$z(x, y) = \frac{c(x^2 + y^2)}{1 + \sqrt{1 - (1+k)c^2(x^2 + y^2)}},$$

wherein z represents surface sag, c represents surface curvature, c=−0.003565906194572, k represents conic constant, and k=−3.6682272262351.

4. The freeform surface off-axial three-mirror imaging system of claim 1, wherein in the three-dimensional rectangular coordinate system (X, Y, Z), a distance between a center of the primary mirror and a center of the secondary mirror in the Z-axis direction is about 314.8834031968 mm, and a distance between a center of the compensating mirror and a center of the secondary mirror in the Z-axis direction is about 339.8834031968 mm.

5. The freeform surface off-axial three-mirror imaging system of claim 1, wherein an angle between the compensating mirror and the Y-axis is about 45°.

6. The freeform surface off-axial three-mirror imaging system of claim 1, wherein a field of view of the freeform surface off-axial three-mirror imaging system is 1.0°×0.2°.

7. A freeform surface off-axial three-mirror imaging system, comprising:
a primary mirror, a secondary mirror, and a compensating mirror, wherein the primary mirror, the secondary mirror and the compensating mirror are located adjacent and spaced away from each other, a surface shape of each of the primary mirror and the secondary mirror is a quadric surface, the primary mirror is an aperture stop, a surface shape of the compensating mirror is a freeform surface, and a light emitted from a light source is reflected by the primary mirror, the secondary mirror, the compensating mirror to form an image on an image plane; and a field of view of the freeform surface off-axial three-mirror imaging system is 1.0°×0.2°, and an F-number of view of the freeform surface off-axial three-mirror imaging system is 5;

a first three-dimensional rectangular coordinates system (X, Y, Z) is defined by a location of the secondary mirror, a vertex of the secondary mirror is an origin of the three-dimensional rectangular coordinates system (X, Y, Z), a reflective surface of the compensating mirror is an xy polynomial freeform surface; and an xy polynomial equation is $$z(x, y) = \frac{c(x^2 + y^2)}{1 + \sqrt{1 - (1+k)c^2(x^2 + y^2)}} + \sum_{i=1}^{N} A_i x^m y_1^n,$$

wherein z represents surface sag, c represents surface curvature, k represents conic constant, while Ai represents an ith term coefficient; and the reflective surface of compensating mirror is a fourth-order polynomial freeform surface of xy without odd items of x; and an equation of the fourth-order polynomial freeform surface of xy is:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4,$$

wherein c=0, k=0, $A_2$=0.01810477796091, $A_3$=−0.000129612104901501, $A_5$=3.84698291327196e-006, $A_7$=1.51205186864189e-007, $A_9$=1.112143202781e-006, $A_{10}$=5.64192252755114e-007, $A_{12}$=6.21311873839925e-00, and $A_{14}$=−1.24635789956992e-007.

8. The freeform surface off-axial three-mirror imaging system of claim 7, wherein a reflecting surface of the primary mirror is a quadric surface, and an equation of the quadric surface is:

$$z(x, y) = \frac{c(x^2 + y^2)}{1 + \sqrt{1 - (1+k)c^2(x^2 + y^2)}},$$

wherein z represents surface sag, c represents surface curvature, c=−0.0012011734430515, k represents conic constant, and k=−1.049581159181.

9. The freeform surface off-axial three-mirror imaging system of claim 7, wherein a reflecting surface of the secondary mirror is a quadric surface, and an equation of the quadric surface is:

$$z(x, y) = \frac{c(x^2 + y^2)}{1 + \sqrt{1 - (1+k)c^2(x^2 + y^2)}},$$

wherein z represents surface sag, c represents surface curvature, c=−0.003565906194572, k represents conic constant, and k=−3.6682272262351.

10. The freeform surface off-axial three-mirror imaging system of claim 7, wherein in the three-dimensional rectangular coordinate system (X, Y, Z), a distance between a center of the primary mirror and a center of the secondary mirror in the Z-axis direction is about 314.8834031968 mm, and a distance between a center of the compensating mirror and a center of the secondary mirror in the Z-axis direction is about 339.8834031968 mm.

11. A freeform surface off-axial three-mirror imaging system, comprising:

a primary mirror, a secondary mirror, and a compensating mirror, wherein the primary mirror, the secondary mirror and the compensating mirror are located adjacent and spaced away from each other, a surface shape of each of the primary mirror and the secondary mirror is a quadric surface, the primary mirror is an aperture stop, a surface shape of the compensating mirror is a freeform surface, and a light emitted from a light source is reflected by the primary mirror, the secondary mirror, the compensating mirror to form an image on an image plane;

a first three-dimensional rectangular coordinates system (X, Y, Z) is defined by a location of the secondary mirror, a vertex of the secondary mirror is an origin of the three-dimensional rectangular coordinates system (X, Y, Z), a reflective surface of the compensating mirror is an xy polynomial freeform surface; and an xy polynomial equation is $$z(x, y) = \frac{c(x^2 + y^2)}{1 + \sqrt{1 - (1+k)c^2(x^2 + y^2)}} + \sum_{i=1}^{N} A_i x^m y^n,$$

wherein z represents surface sag, c represents surface curvature, k represents conic constant, while Ai represents an ith term coefficient; and a reflecting surface of the primary mirror is a quadric surface, and an equation of the quadric surface is:

$$z(x, y) = \frac{c(x^2 + y^2)}{1 + \sqrt{1 - (1+k)c^2(x^2 + y^2)}}$$

wherein z represents surface sag, c represents surface curvature, c=−0.0012011734430515, k represents conic constant, and k=−1.049581159181.

12. The freeform surface off-axial three-mirror imaging system of claim 11, wherein the reflective surface of compensating mirror is a fourth-order polynomial freeform surface of xy without odd items of x; and an equation of the fourth-order polynomial freeform surface of xy is:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4,$$

wherein c=0, k=0, $A_2$=0.01810477796091, $A_3$=−0.000129612104901501, $A_5$=3.84698291327196e-006, $A_7$=1.51205186864189e-007, $A_9$=1.112143202781e-006, $A_{10}$=5.64192252755114e-007, $A_{12}$=6.21311873839925e-00, and $A_{14}$=−1.24635789956992e-007.

13. The freeform surface off-axial three-mirror imaging system of claim 11, wherein a reflecting surface of the secondary mirror is a quadric surface, and an equation of the quadric surface is:

$$z(x, y) = \frac{c(x^2 + y^2)}{1 + \sqrt{1 - (1+k)c^2(x^2 + y^2)}},$$

wherein z represents surface sag, c represents surface curvature, c=−0.003565906194572, k represents conic constant, and k=−3.6682272262351.

14. The freeform surface off-axial three-mirror imaging system of claim 11, wherein in the three-dimensional rectangular coordinate system (X, Y, Z), a distance between a center of the primary mirror and a center of the secondary mirror in the Z-axis direction is about 314.8834031968 mm, and a distance between a center of the compensating mirror and a center of the secondary mirror in the Z-axis direction is about 339.8834031968 mm.

15. The freeform surface off-axial three-mirror imaging system of claim 11, wherein an angle between the compensating mirror and the Y-axis is about 45°.

16. The freeform surface off-axial three-mirror imaging system of claim 11, wherein a field of view of the freeform surface off-axial three-mirror imaging system is 1.0°×0.2°, and an F-number of view of the freeform surface off-axial three-mirror imaging system is 5.

* * * * *